United States Patent Office 3,448,099
Patented June 3, 1969

3,448,099
PROCESS FOR THE INDUSTRIAL MANUFACTURE OF HYDROXOCOBALAMIN
Jean Boige, 53 Ave. Vercingetorix, Aulnay-sous-Bois, Seine-St. Denis, France
No Drawing. Filed Feb. 20, 1967, Ser. No. 617,044
Claims priority, application France, Mar. 7, 1966, 52,303
Int. Cl. C07d 55/62
U.S. Cl. 260—211.7      9 Claims

ABSTRACT OF THE DISCLOSURE

A continuous process for the production of hydroxocobalamin from an aqueous solution of cyanocobalamin, in which the solution is initially at a pH of 1.5–3, preferably 2–2.5, and is passed through a column of granulated zinc where hydrogen is generated in situ. The hydrogenated liquid is then oxidized by bubbling an oxidizing gas through it. A water-miscible organic solvent is added to the solution of cyanocobalamin prior to its contact with the zinc, and this greatly reduces what would otherwise be the tendency of the process to give progressively lower yields and also improves the quality of the product.

---

This invention relates to an improved process for the industrial production of hydroxocobalamin (or vitamin $B_{12b}$) starting from cyanocobalamin (or vitamin $B_{12}$).

The process to which the instant invention applies comprises hydrogenating an acid solution of cyanocobalamin followed by oxidizing.. The hydrogenation is effected using nascent hydrogen "in situ," by contact of the acid solution of cyanocobalamin with granulated zinc, after which the oxidation is effected by bubbling an oxidizing gas such as air into the liquid obtained diluted with water.

Preferably the process above referred to and to which the instant invention pertains, comprises passing a solution of cyanobalamin in a strong inorganic acid (such as hydrochloric, hydrobromic, hydroiodic or sulfuric acid) through a column of zinc granules, the pH of said acid solution being substantially comprised between 1.5 and 3 and preferably between 2 and 2.5 and the granulometry of the zinc granules being substantially between 200 and 1400 microns, the corresponding step being performed at room temperature and under atmospheric pressure. As soon as the reduced solution leaves the zinc column, it is diluted with water and thereafter air or another oxidizing gas is bubbled therethrough. The soluble zinc salts contained in the solution thus obtained are precipitated by adding thereto an inorganic base such as caustic soda, ammonia or baryta whereafter hydroxocobalamin is separated, for instance by evaporating.

The rate of passage of the acid solution of cyanocobalamin through the zinc column is preferably controlled so that the pH of the solution delivered by said column is about 6.5.

Such a prior process constitutes the subject matter of U.S. Patent 3,138,583 filed on June 23, 1964, in my name and that of Mr. Robert Cote.

Although the efficiency of the above process is industrially very considerable, it has however been found from experience that variations may occur from one operation to another, sometimes deviating rather substantially from the theoretical yield.

In particular it has been found that the yield fell when operations were prolonged on a particular zinc column. It was necessary therefore to change the zinc charge after several successive operations.

Depending on the grain size of the zinc and the speed of passage of the liquid it was also possible to find variations in yield which were sometimes quite substantial which made it necessary to operate in a very accurate and careful manner at each change which might affect the height of the column and the grain size of the zinc.

In analyzing the data more closely it was found, according to the instant invention, that the difference in yield arose from an adsorption of the cobalamins formed on the zinc granules. The products thus adsorbed could only be completely recuperated after extensive washing of the zinc column. Moreover if these cobalamins are kept too long in contact with the zinc granules they are liable to deteriorate and are thereafter no more liable to be transformed into hydroxocobalamin. Finally, because of this the zinc might be attacked by the acid irregularly.

It is therefore among the objects of the invention to obviate the drawbacks and limitations above explained.

According to the present invention the process of production of hydroxocobalamin, of the kind above referred to, is characterized in that the aqueous and acid solution of cyanocobalamin used is diluted with a small amount of an organic solvent miscible with water.

Preferably the organic solvent miscible with water which is used has the properties of being very soluble in water, of reducing the surface tension of the cyanocobalamin solution and of playing the part of a solvent together for the cyanocobalamin, the hydroxocobalamin, the cobalamins and the deteriorated products thereof, such as those termed "yellow substances."

In particular the solvent is advantageously selected among following agents: acetone, tetrahydrofurane, dioxane, methyl alcohol, ethyl alcohol, butyl alcohol, isopropyl alcohol, isobutyl alcohol.

The proportion of organic solvent required must be large enough to prohibit the cobalamins from being adsorbed on the zinc granules but it must not be too high for preventing the acid from reacting with the zinc granules. Experiments show that the proportion of organic solvent is advantageously comprised between 5 to 25% of the aqueous solution of cyanocobalamin, the preferred proportion being of about 10%.

In a particular embodiment of the invention, the organic solvent used is furthermore the same as that provided for the subsequent operation of chromatography which makes it possible to separate the hydroxocobalamin formed from the unreacted cyanocobalamin.

Experiments have shown surprisingly that the means above set forth improve the yield both qualitatively and quantitatively. This remarkable result can be explained a posteriori by supposing that the presence of the solvent, while lowering the surface tension of the cyanocobalamin solution, prevents the physical adsorption of the hydroxocobalamin by the zinc. The result is that the reaction is more complete, and the product which is formed can be re-oxidized immediately.

In this way it can be explained how the increase in yield obtained in an operation is of the order of 10 to 20%, which incidentally renders the transformation of cyanocobalamin into hydroxocobalamin practically quantitative.

Experience shows further that the solution of hydroxocobalamin obtained contains much less of the products of degradation, which greatly facilitates subsequent purification. The products of degradation some times found to a very slight extent, it is true, in the hydroxocobalamin, are due to the cyanocobalamin in reduced form having remained adsorbed too long on the zinc. The subsequent oxidization is then no longer capable of causing the cobalt to pass from valency 2 to valency 3, and products of degradation are obtained in which the CN group group has been taken away while the cobalt has remained bivalent.

In some cases the products adsorbed can be degraded more thoroughly by nascent hydrogen and then form yellow substances, the chemical composition of which derives from that of the cyanobalamin, but where some chains have disappeared besides the CN group. The exact composition of these yellow substances has not yet been determined, but their spectrum is completely different from that of cyanocobalamin or hydroxocobalamin, which shows a considerable difference in structure. Moreover experience shows, also that the degraded substances above referred to and particularly the yellow substances have practically no therapeutic value. What makes indeed the therapeutic value of hydroxocobalamin is the fact that the cobalt atom thereof is liable to take di- or trivalent forms and hence to permit useful biochemical reactions.

The presence of these yellow substances in the hydroxocobalamin formed, as also that of the other degraded products, is practically eliminated thanks to the improvements provided by this invention.

The following examples, illustrate the invention in a nonlimiting manner.

Example 1 (Comparative example)

(a) An acid decinormal solution of cyanocobalamin, containing 15 g. per liter of cyanocobalamin is passed through a column of zinc granules, said column having a diameter of 50 mm., a height of 250 mm. and an average granulometry of about 1000 microns. The rate of passage of the solution through the column is 1 liter per hour.

The pH of the solution delivered by the column is controlled and this solution is immediately oxidized by bubbling air therethrough according to the prior technique. The pH of the solution delivered by the column is about 6.5 and the spectrum after the oxidizing step establishes the fact that the transformation of cyanocobalamin into hydroxocobalamin is nearly quantitative.

After about two hours, the pH tends to rise. The speed of passage of the acid solution is then lowered. The pH becomes normal again although the liquid delivered by the column is more maroon.

After about four hours of performance, a spectroscopic analysis shows that the transforming of cyanocobalamin into hydroxocobalamin is not so good. It is necessary to stop the performance and to wash the zinc column in order to eliminate the degraded substances precipitated on the zinc granules.

Finally the continuous performance of the process could not last more than 4 hours under good conditions. Moreover it has been stated that when the zinc granules began to be spoiled, it was necessary to reduce the rate of passage of the acid solution through the column in order to obtain a complete hydrogenating, and from that time degraded products appeared which lowered the yield of the reaction.

(b) The zinc granules being very carefully washed, a further performance is initiated with the same acid solution of cyanocobalamin to which acetone in a proportion of 10% has been added.

At the same rate of passage of 1 litre/hour, the solution is poured into the zinc column. The yield at the beginning of the performance is practically quantitative.

The column being still fed with the acid solution of cyanocobalamin, no change happens after 4 hours and hydrogenating is performed without stop during more than 5 hours without any detrimental change. The zinc is still unspoiled and hydrogenating is performed without any incident. The performance is then stopped but without necessity. Before stopping said performance, it has been tried to increase the rate of passage up to the double: 2 litres/hour, without any problem and without difficulty or inconvenience concerning the quality and the yield of hydroxocobalamin.

It is thus clear that the use of a solvent results in steady hydrogenating conditions and in a better ease in the control of the reaction.

Example 2

15 g. of cyanocobalamin are dissolved in 3 liters of a N/10 solution of hydrochloric acid to which 300 cc. of acetone are added. After mixing the solution is passed through a column containing about 600 g. of zinc granules the granulometry of which is about 1000 microns. The rate of passage is controlled so that the pH value of the liquid delivered by the column is kept to a steady value substantially of 6.5.

The zinc column is thereafter rinsed out by passing therethrough 500 cc. of water. The liquid delivered by the column from the start has been collected in a flask and air has been continuously bubbled in through the collected solution in order to reoxidize the same as soon as it leaves the column.

The oxidizing step is still carried on during 10 minutes after collecting the last washing water. The solution is then ruby red.

Hydroxocobalamin of the solution thus collected is titrated with a spectrophotometer and 14.5 g. of hydroxocobalamin are found.

The above solution is neutralized by a N/10 solution of caustic soda which is agitated therewith, so that zinc salts precipitate. The solution is filtered, then subjected to a chromatography in an alumina chromatographic column. Thereafter hydroxocobalamin is subjected to a crystallization in acetone.

Experiments show that the hydroxocobalamin prepared in this way does not contain more than 3/1000 of cyanocobalamin.

Example 3

15 g. of vitamin $B_{12}$ are used dissolved in 1.5 liters and N/5 sulphuric acid. 200 cc. of tetrahydrofurane are added, and, after mixing, the liquid is passed over the zinc column of Example 2.

After re-oxidization the hydrocobalamin obtained is determined by spectrometer and 14.2 g. are found.

Example 4

Starting with 10 g. of cyanocobalamin which is dissolved in 2 liters of decinormal hydrochloric acid, 200 cc. of dioxane are added. This solution is homogenised and passed over a zinc column as above in Example 2 and the hydroxocobalamin obtained is determined after oxidization. At this stage 9.8 g. of hydroxocobalamin are obtained.

Example 5

Starting with 10 g. of cyanocobalamin which is dissolved in 2 litres of decinormal hydrochloric acid, 400 cc. of ethyl alcohol are added. The solution is treated as in Example 2. After oxidizing of the solution collected from the column, 9.8 g. of hydroxocobalamin are obtained.

I claim:
1. A process for the substantially continuous production of hydroxocobalamin from a solution of cyanocobalamin, said process comprising hydrogenating cyanocobalamin in acid solution by flowing said solution through and in contact with granulated zinc and bubbling an oxidizing gas into the hydrogenated liquid delivered by said granulated zinc diluted with water, characterized in that said acid solution of cyanocobalamin is diluted with a water-miscible organic solvent prior to its contact with said zinc.

2. A process as claimed in claim 1, said solvent having high solubility in water and reducing the surface tension of the cyanocobalamin solution and being a solvent for cyanocobalamin, hydroxocobalamin, the cobalamins and the degraded substances derived therefrom.

3. A process as claimed in claim 1, in which said solvent is a member selected from the group consisting of acetone, tetrahydrofurane, dioxane, methyl alcohol, ethyl alcohol, butyl alcohol, isopropyl alcohol, and isobutyl alcohol.

4. A process as claimed in claim 1, in which said solvent is used in the proportion substantially of 5–25% of the cyanocobalamin solution.

5. A process as claimed in claim 1, in which said solvent is used in a proportion of about 10% of the cyanocobalamin solution.

6. A process as claimed in claim 1, in which the pH of said acid solution is maintained substantially between 1.5 and 3 prior to its contact with said zinc.

7. A process as claimed in claim 6, in which said pH is between 2 and 2.5.

8. A porous as claimed in claim 1, and chromatographically separating the hydroxocobalamin formed from unreacted cyanocobalamin by the use of the same said organic solvent.

9. A process as claimed in claim 1, in which the pH of said acid solution is maintained substantially between 1.5 and 3 prior to its contact with said zinc, said organic solvent is used in a proportion substantially of 5 to 25% of the cyanocobalamin solution, and said solvent is a member selected from the group consisting of acetone, tetrahydrofurane, dioxane, methyl alcohol, ethyl alcohol, butyl alcohol, isopropyl alcohol, and isobutyl alcohol.

References Cited

UNITED STATES PATENTS

| | | |
|---|---|---|
| 2,738,302 | 3/1956 | Kaczka et al. |
| 2,830,009 | 4/1958 | Ziegler. |
| 3,138,583 | 6/1964 | Boige et al. |

LEWIS GOTTS, *Primary Examiner.*

JOHNNIE R. BROWN, *Assistant Examiner.*